(12) United States Patent
Danilchenko et al.

(10) Patent No.: US 11,005,809 B2
(45) Date of Patent: May 11, 2021

(54) METHODS, DEVICES, AND SYSTEMS FOR GENERATING A PLURALITY OF NETWORK ADDRESSES FOR A PLURALITY OF COMMUNICATION DEVICES

(71) Applicant: MOTOROLA SOLUTIONS, INC., Schaumburg, IL (US)

(72) Inventors: Kiril Danilchenko, Beer Sheva (IL); Baruh Hason, Tel Aviv-Yaffo (IL); Guy Holtzman, Tel Aviv (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1021 days.

(21) Appl. No.: 15/084,274

(22) Filed: Mar. 29, 2016

(65) Prior Publication Data
US 2017/0289096 A1 Oct. 5, 2017

(51) Int. Cl.
*H04L 29/12* (2006.01)

(52) U.S. Cl.
CPC ...... *H04L 61/2007* (2013.01); *H04L 61/2046* (2013.01); *H04L 61/2061* (2013.01); *H04L 61/609* (2013.01)

(58) Field of Classification Search
CPC .................................................. H04L 61/2007
See application file for complete search history.

(56) References Cited

U.S. PATENT DOCUMENTS

| | | | |
|---|---|---|---|
| 7,024,552 B1 * | 4/2006 | Caswell | H04L 9/3297 713/155 |
| 7,440,424 B2 | 10/2008 | Nam et al. | |
| 7,633,884 B2 | 12/2009 | Kang | |
| 8,856,389 B1 * | 10/2014 | Li | G06F 13/387 710/32 |
| 9,110,778 B2 * | 8/2015 | Fleischer | G06F 12/02 |
| 9,148,373 B2 | 9/2015 | Kahng et al. | |
| 2002/0129218 A1 * | 9/2002 | Cox | H04L 49/90 711/200 |
| 2003/0012406 A1 * | 1/2003 | Iwamura | H04N 1/32203 382/100 |
| 2003/0200140 A1 * | 10/2003 | Hars | G06Q 30/0235 705/14.31 |
| 2004/0047405 A1 * | 3/2004 | Boesel | H04B 1/712 375/219 |

(Continued)

*Primary Examiner* — Yves Dalencourt
*Assistant Examiner* — Sm Z Islam
(74) *Attorney, Agent, or Firm* — Michael Best and Friedrich LLP

(57) ABSTRACT

Methods, devices, and systems for generating a plurality of network addresses for a plurality of communication devices communicating over a network. One method includes receiving, with an electronic processor included in a server, geographical coordinates of the network, generating, with the electronic processor, a first set of bits based on the geographical coordinates, generating, with the electronic processor, a second set of bits based on a random number, and generating, with the electronic processor, a baseline address including the first set of bits and the second set of bits. The method also includes generating the plurality of network addresses, wherein each of the plurality of network addresses includes the baseline address and a unique offset. In addition, the method includes assigning one of the plurality of network addresses to one of the plurality of communication devices.

22 Claims, 5 Drawing Sheets

(56) References Cited

U.S. PATENT DOCUMENTS

| | | | |
|---|---|---|---|
| 2006/0072660 A1* | 4/2006 | Jia | H04N 19/90 |
| | | | 375/240.03 |
| 2006/0274643 A1* | 12/2006 | Choyi | H04L 29/12009 |
| | | | 370/216 |
| 2009/0154406 A1 | 6/2009 | Kim et al. | |
| 2010/0070368 A1* | 3/2010 | Choi | G06Q 30/02 |
| | | | 705/14.58 |
| 2010/0189264 A1* | 7/2010 | Haddad | H04L 29/12301 |
| | | | 380/283 |
| 2013/0223447 A1* | 8/2013 | Kahng | H04L 45/741 |
| | | | 370/392 |
| 2013/0230035 A1* | 9/2013 | Grandhi | H04W 48/16 |
| | | | 370/338 |
| 2014/0129799 A1* | 5/2014 | Fleischer | G06F 9/3887 |
| | | | 711/207 |
| 2015/0116564 A1* | 4/2015 | Williams | H04N 5/3742 |
| | | | 348/308 |
| 2015/0127790 A1* | 5/2015 | Smith | H04L 41/0816 |
| | | | 709/221 |

* cited by examiner

METHODS, DEVICES, AND SYSTEMS FOR GENERATING A PLURALITY OF NETWORK ADDRESSES FOR A PLURALITY OF COMMUNICATION DEVICES

BACKGROUND OF THE INVENTION

Communication devices communicating over a network are assigned a unique network address. For example, in internet protocol (IP) networks, a server assigns an internet protocol address from a plurality of internet protocol (IP) addresses (sometimes referred to as a "pool" of addresses) to each communication device (sometimes referred to as a client). In internet protocol networks, addresses may be assigned using dynamic assignment or static assignment. Regardless of the method used, however, the server assigns each communication device a unique address to prevent address conflicts. However, during a handover process or when a communication network is merged with another communication network, there is a risk of address conflicts when the pools of addresses for networks overlap. Address conflicts cause delays and communication errors, which are undesirable in all types of networks and are especially undesirable in public safety networks.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
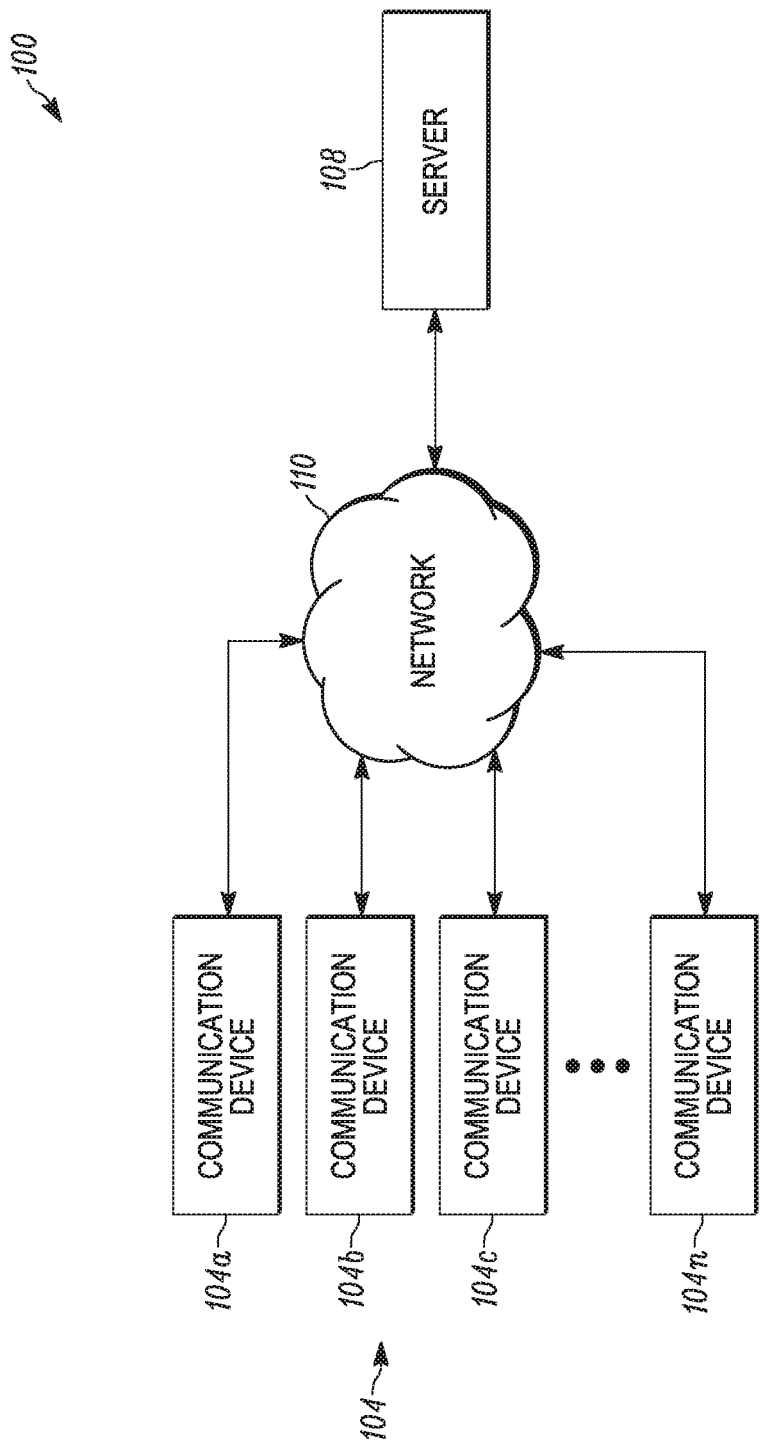
FIG. 1 is a block diagram of a communication system including a server and a plurality of communication devices in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of generating a plurality of network addresses for a plurality of communication devices communicating over a network. The method includes receiving, with an electronic processor included in a server, geographical coordinates of the network, generating, with the electronic processor, a first set of bits based on the geographical coordinates, generating, with the electronic processor, a second set of bits based on a random number, and generating, with the electronic processor, a baseline address including the first set of bits and the second set of bits. The method also includes generating the plurality of network addresses, wherein each of the plurality of network addresses includes the baseline address and a unique offset. In addition, the method includes assigning one of the plurality of network addresses to one of the plurality of communication devices.

Another embodiment provides a server for generating a plurality of network addresses for a plurality of communication devices communicating over a network. The server includes a memory storing a plurality of instructions and an electronic processor. The electronic processor is electrically coupled to the memory and configured to execute the plurality of instructions to receive geographical coordinates of the network, generate a first set of bits based on the geographical coordinates, generate a second set of bits based on a random number, generate a baseline address including the first set of bits and the second set of bits, generate the plurality of network addresses, wherein each of the plurality of network addresses includes the baseline address and a unique offset, and assign one of the plurality of network addresses to one of the plurality of communication devices.

Yet another embodiment provides a system comprising a plurality of communication devices communicating over a network, and a server for generating a plurality of network addresses for the plurality of communication devices. The server includes a transceiver and an electronic processor. The electronic processor is electrically coupled to the transceiver and configured to generate a first set of bits based on a geographical coordinates of the network, generate a second set of bits based on a random number, generate a baseline address including the first set of bits and the second set of bits, generate the plurality of network addresses, wherein each of the plurality of network addresses includes the baseline address and a unique offset, assign one of the plurality of network addresses to one of the plurality of communication devices, and transmit a beacon including the random number with the transceiver.

FIG. 1 is a block diagram of a communication system 100 in accordance with some embodiments. As illustrated in FIG. 1, the communication system 100 includes a communication device 104*a*, a communication device 104*b*, a communication device 104*c*, and a communication device 104*n* (collectively referred to as "a plurality of communication devices 104" or "communication devices 104"), a server 108, a network 110. The network 110 may be a wired or a wireless communication network, such as a cellular network, the Internet, a land mobile radio (LMR) network, a Bluetooth™ network, a wireless accessory Personal Area Networks (PAN), a Machine-to-machine (M2M) autonomous network, a public switched telephone network, a future developed network, or any combination or derivative thereof. In some embodiments, the network 110 has one of a ring topology, mesh topology, star topology, fully connected topology, line topology, tree topology, bus topology, or other suitable network topology. In some embodiments, the server 108 also communicates with the plurality of communication devices 104 over the network 110. It should be understood that although four communication devices are illustrated in FIG. 1, the plurality of communication devices 104 may include fewer or additional communication devices.

In some embodiments, the plurality of communication devices 104 may include mobile devices (for example, smartphones, tablets, smart watches, and the like), fixed devices (for example, a desktop computer, a server, and the like), or a combination thereof. Each communication device included in the plurality of communication devices 104 may include, among other components, a communication interface for communicating over the network 110. The communication interface may include a port or connection for receiving a wired connection to the network 110 (for example, an Ethernet cable, fiber optic cable, a telephone cable, or the like), a wireless transceiver for communicating over the network 110, or a combination thereof.

As described in more detail below, the server 108 may generate a plurality of network addresses (a pool of network addresses) and may assign each of the plurality of communication devices 104 a unique address from the pool of network addresses. In some embodiments, the pool of network addresses includes an internet protocol (IP) address. The server 108 may assign network addresses in a static fashion or a dynamic fashion. For example, in some embodiments, the server 108 assigns network addresses using a dynamic host configuration protocol (DHCP).

Figure 2:
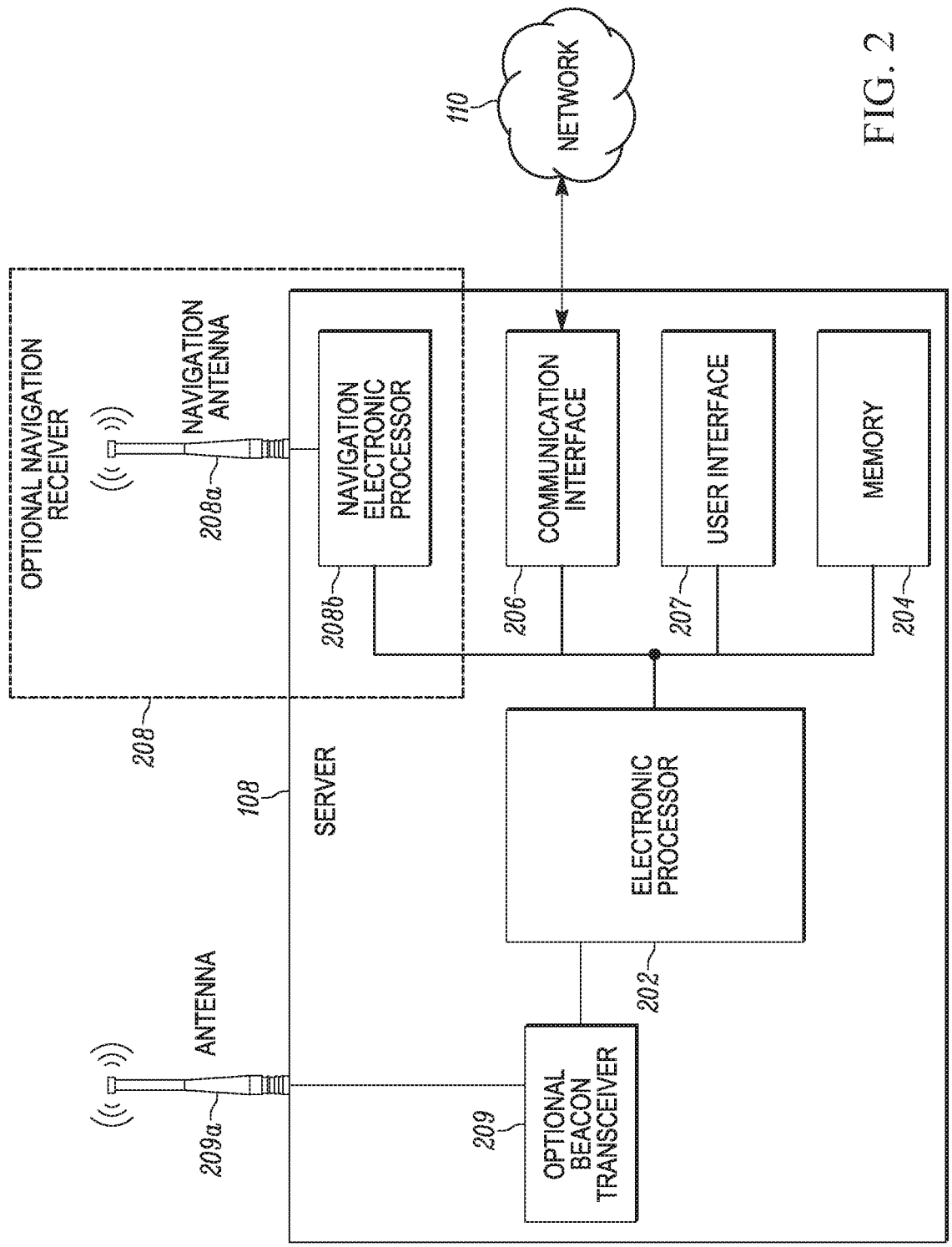
FIG. 2 is a block diagram of the server included in the system of FIG. 1 in accordance with some embodiments.

FIG. 2 is a block diagram of a server 108 in accordance with some embodiments. It should be understood that, in some embodiments, the server 108 may include fewer or additional components in configurations different from that illustrated in FIG. 2. Also the server 108 may perform additional functionality than the functionality described herein. In addition, the functionality of the server 108 may be incorporated into one or more of the plurality of communication devices 104, other servers, or a combination thereof.

As illustrated in FIG. 2, the server 108 includes an electronic processor 202 (for example, a microprocessor or another suitable processing device), a memory 204 (for example, a non-transitory computer-readable storage medium), a communication interface 206, one or more optional user interfaces 207, an optional navigation receiver 208, and an optional beacon transceiver 209. The electronic processor 202, the memory 204, the communication interface 206, the optional user interfaces 207, the optional navigation receiver 208, and the optional beacon transceiver 209 are electrically coupled by one or more control or data buses enabling communication between the components.

The memory 204 may include a program storage area (for example, read only memory (ROM)) and a data storage area (for example, random access memory (RAM), and other non-transitory, machine-readable medium). For example, the data storage area of the memory 204 may store a geographical location of the network 110 (for example, one or more geographical coordinates). The electronic processor 202 executes machine-readable instructions stored in the memory 204. For example, the electronic processor 202 may execute instructions stored in the memory 204 to perform the methods described herein.

The communication interface 206 receives data from and provides data to devices external to the server 108, such as the communication devices 104, via the network 110. For example, the communication interface 206 may include a port or connection for receiving a wired connection (for example, an Ethernet cable, fiber optic cable, a telephone cable, or the like), a wireless transceiver, or a combination thereof.

The optional one or more user interfaces 207 may include one or more input mechanisms (for example, a touch screen, a keypad, a button, a knob, and the like), one or more output mechanisms (for example, a display, a printer, a speaker, and the like), or a combination thereof. The user interfaces 207 receive input from a user, provide output to a user, or a combination thereof. In some embodiments, as an alternative to or in addition to managing inputs and outputs through the user interfaces 207, the server 108 may receive user input, provide user output, or both by communicating with an external device, such as a console computer, over a wired or wireless connection (for example, through the communication interface 206).

The optional navigation receiver 208 determines geographical coordinates for the server 108. In particular, the optional navigation receiver 208 may include a navigation antenna 208a and a dedicated navigation electronic processor 208b. The navigation electronic processor 208b receives satellite signals from a global navigation system (GNSS), such as a global positioning system (GPS), through the navigation antenna 208a and processes the received signals to determine a geographical location (one or more geographical coordinates) of the server 108. It should be understood that the navigation receiver 208 may use a regional satellite navigation system, a land-based navigation system, or a combination thereof in conjunction with or in place of a GNSS system. Also, in some embodiments, the navigation receiver 208 may be located external to the server 108 and may provide a geographical location to the server 108 over a wired or wireless connection (for example, over the network 110).

In some embodiments, the optional beacon transceiver 209 receives data and provides data wirelessly, such as using the Bluetooth™ protocol, the Bluetooth™ low energy (BLE) protocol, the Long Term Evolution System Information Block (LTE SIB) protocol, the wireless local area network (WLAN) protocol, the near field communication (NFC) protocol, the Wi-Fi™ protocol, and other suitable communication protocols. Accordingly, the optional beacon transceiver 209 may be coupled to an antenna 209a for receiving and transmitting data wirelessly. Also, in some embodiments, the functionality performed by the optional beacon transceiver 209 described herein may be performed by the communication interface 206. Accordingly, in these embodiments, the server 108 may not include the optional beacon transceiver 209 separate from the communication interface 206.

Figure 3:
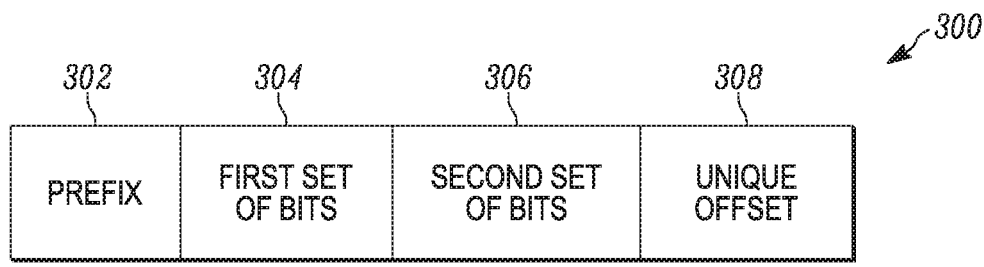
FIG. 3 illustrates a structure of a network address in accordance with some embodiments.

As noted above, the electronic processor 202 executes instructions stored in the memory 204 to generate a pool of network addresses, such as internet protocol addresses. FIG. 3 illustrates a structure 300 of an internet protocol address according with some embodiments. It should be understood that the structure 300 illustrated in FIG. 3 is merely provided as an example, and a network address may include fewer, additional, or different sections than illustrated in FIG. 3. Similarly, the order of the sections illustrated in FIG. 3 is provided as one example order and the order of the sections may be different in other embodiments.

As illustrated in FIG. 3, each internet protocol address may be divided into one or more sections, including a prefix 302, a first set of bits 304, a second set of bits 306, and a unique offset 308. In some embodiments, each address includes 32 bits. In these embodiments, the prefix 302 may include 8 bits (for example, having a value of 10 or 172) and the remaining 24 bits may be apportioned among the first set of bits 304, the second set of bits 306, and the unique offset 308. In some embodiments, the first set of bits 304 and the second set of bits 306 are referred to herein as the baseline address. In some embodiments, the prefix 302, the first set of bits 304, and the second set of bits 306 are identical within a pool of network addresses with the unique offset 308 making each network address unique.

In some embodiments, the number of bits included in the unique offset 308 is based on the size of the plurality of communication devices 104 (the number of communication devices included in the plurality of communication devices 104 that the server 108 needs to assign a unique network address to). For example, the unique offset 308 may be used to provide a unique population value as part of each network address. Therefore, in some embodiments, at a minimum, the unique offset 308 include a number of bits needed to provide a number of unique population values equal to the number of communication devices included in the plurality of communication devices 104. For example, when there are 128 communication devices included in the plurality of communication devices 104, the unique offset 308 may include 7 bits, which allows the unique offset 308 to represent the values 0 to 127.

Figure 4:
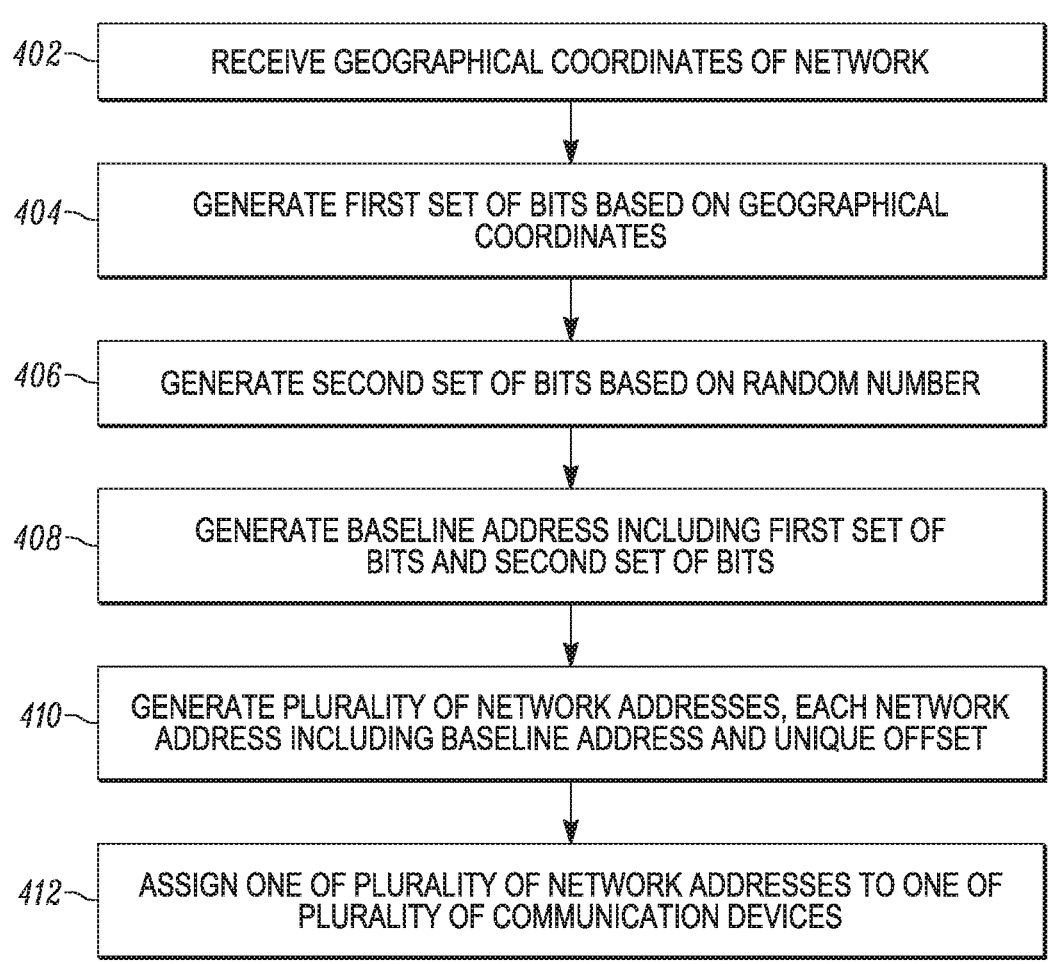
FIG. 4 is a flowchart illustrates a method of generating a plurality of network addresses performed by the system of FIG. 1 in accordance with some embodiments.

FIG. 4 is a flowchart illustrating one method 400 of generating network addresses for the plurality of communication devices 104 in accordance with some embodiments. The method 400 is described as being performed by the server 108 and, in particular, the electronic processor 202. However, it should be understood that the functionality illustrated in the method 400 may be distributed among multiple devices, such as multiple servers.

As illustrated in FIG. 4, the electronic processor 202 receives geographical coordinates of the network 110 (at block 402). The geographical coordinates may include a latitudinal coordinate and a longitudinal coordinate. The geographical coordinates may represent geographical coordinates of the server 108, one of the plurality of communication devices 104, a coverage area of the network 110 (for example, a center location of the coverage area of the network 110), and the like. In some embodiments, the electronic processor 202 receives the geographical coordinates from a user (for example, receives the geographical coordinates through one or more of the optional user interfaces 207). Alternatively or in addition, the electronic processor 202 receives the geographical coordinates from one of the plurality of communication devices 104 or another device (for example, receives the geographical coordinates from the communication interface 206). Alternatively or in addition, the electronic processor 202 receives the geographical coordinates from the optional navigation receiver 208. Regardless of how the geographical coordinates are received by the electronic processor 202, the electronic processor 202 may store the geographical coordinates to the memory 204. Therefore, as described herein with reference to method 400, the electronic processor 202 may receive the geographical coordinates from a user, a device external to the server 108, the navigation receiver 208, the memory 204, or a combination thereof.

As illustrated in FIG. 4, the electronic processor 202 uses the geographical coordinates to generate a first set of bits 304 (at block 404). In some embodiments, the electronic processor 202 generates the first set of bits 304 by selecting a first sub-string of bits from on a latitudinal coordinate included in the geographical coordinates, selecting a second sub-string of bits from a longitudinal coordinate included in the geographical coordinates, and including the first sub-string of bits and the second sub-string of bits in the first set of bits 304. For example, the first set of bits 304 may include the concatenation of the first sub-string of bits and the second sub-string of bits.

It should be understood that in some embodiments, the first sub-string of bits selected from the latitudinal coordinate may include a different number of bits than the second sub-string of bits selected from the longitudinal coordinate. Also, in some embodiments, the first sub-string of bits may include the latitudinal coordinate or a portion thereof. Similarly, the second sub-string of bits may include the longitudinal coordinate of a portion thereof. For example, in some embodiments, the electronic processor 202 selects the first sub-string of bits from a portion of the latitudinal coordinate excluding one or more most significant bits, one or more least significant bits of the latitudinal coordinate, or a combination thereof. Similarly, in some embodiments, the electronic processor 202 selects the second sub-string of bits from a portion of the longitudinal coordinate excluding one or more most significant bits, one or more least significant bits of the longitudinal coordinate, or a combination thereof. For example, the geographical coordinates received by the electronic processor 202 may include 32 bits representing the latitudinal coordinate and 32 bits representing the longitudinal coordinate. Accordingly, in some embodiments, the first set of bits 304 includes portions of the latitudinal coordinate, the longitudinal coordinate, or both (for example, as compared to including the entire latitudinal coordinate, longitudinal coordinate, or both) to keep the resulting address within a particular bit range (for example, 32 bits).

Excluding one or more of the least significant bits or the most significant bits of the latitudinal coordinate, the longitudinal coordinate, or both may cause the server 108 to generate a value for the first set of bits 304 that is identical to the value of the first set of bits 304 generated by another server also performing the method 400. For example when two servers are located in close vicinity to each other and each server excludes one or more of the least significant bits, each server may generate identical values for the first set of bits 304. Similarly, even when two servers are not located in close vicinity to each other, when the servers exclude one or more of the most significant bits, each server may generate identical values for the first set of bits.

Figure 5:
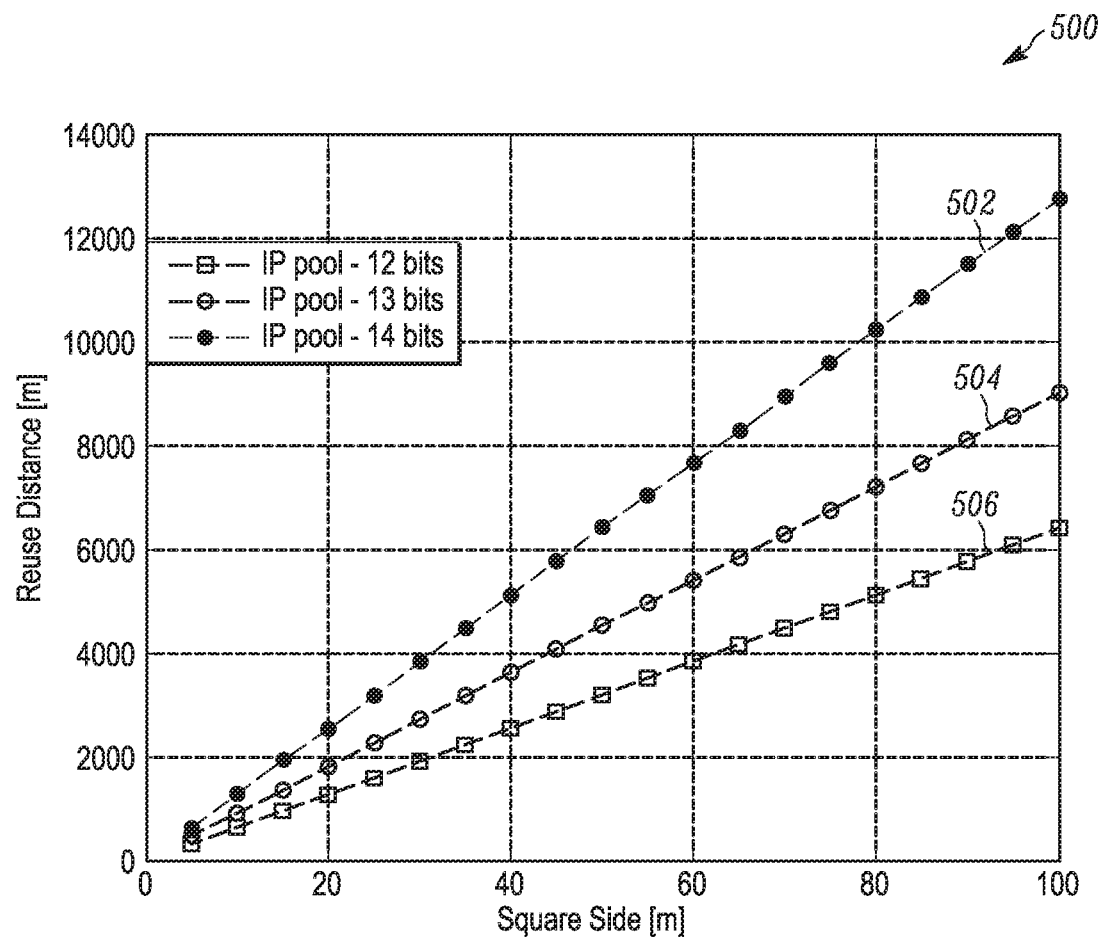
FIG. 5 is a chart illustrating a relationship between portions of the network address of FIG. 3.

For example, FIG. 5 is a chart 500 illustrating a relationship between the portion of coordinates included in the first set of bits 304 and two distances, a square side distance and a reuse distance. In some embodiments, the square side distance represents the geographical distance between servers where the servers would generate the same first set of bits 304 when excluding one or more of the least significant bits. The reuse distance represents a geographical distance between servers where the servers would generate the same first set of bits 304 when excluding one or more of the most significant bits.

In the illustrated embodiment, the line 502 represents a first set of bits 304 that includes 12 bits, the line 504 represents a first set of bits 304 that includes 13 bits, and the line 506 represents a first set of bits 304 that includes 14 bits. The reuse distance is illustrated along the vertical axis of the chart 500. The square side distance is illustrated along the horizontal axis of the chart 500. Movement to the right along the horizontal axis represents shifting to the left of the portion selected from the geographical coordinates (from the least significant bits to the most significant bits). For example, the point on the line 502 closest to the origin of the chart 500 represents selecting a portion of a coordinate that truncates few (if any) least significant bits, and the point on the line 502 furthest from the origin of the chart 500 represents selecting a portion of a coordinate that truncates few (if any) most significant bits. Accordingly, as illustrated by the lines 502, 504, and 506, when few (if any) least significant bits are truncated (see the data points closest to the origin of the chart 500), the square side distance and the reuse distance are small as compared to when more least significant bits are truncated. A small square side distance and a small reuse distance indicate a reduced risk of multiple servers generating the same value for the first set of bits 304. Thus, in some embodiments, the electronic processor 202 truncates few (if any) least significant bits but truncates one or more most significant bits to keep the first set of bits 304 within a predetermined number of bits and to reduce the likelihood of two servers selecting the same value for the first set of bits 304.

It should be understood the bits selected from the geographical coordinates may vary based on the particular application. For example, in some embodiments, the bits selected from the latitudinal coordinate may exclude fewer or additional least significant bits than the bits selected from the longitudinal coordinate. Accordingly, in these embodiments, the square side distances may be rectangular side distances. Similarly, in some embodiments, non-consecutive bits are selected from the latitudinal coordinate, the longitudinal coordinate, or both. Also, in some embodiments, these bits may be selected in a nonlinear manner based on the geographical coordinate. For example, these bits may be selected closer to the least significant bits of a geographical coordinate when the geographical coordinate is near one of the poles (the South Pole or the North Pole) and may be selected closer to the most significant bits of the geographical coordinate when the geographical coordinate is near the equator.

Returning to FIG. 4, the electronic processor 202 also generates the second set of bits 306 based on a random number (at block 406). For example, the electronic processor 202 may generate the random number (for example, using a random number generator, a pseudorandom number generator, or other suitable number generation mechanism) and set the value of the second set of bits 306 to the random number (or a portion thereof). The electronic processor 202 may use the second set of bits 306 to further reduce the likelihood of two networks having the same value for the second set of bits.

The electronic processor 202 generates a baseline address including the first set of bits 304 and the second set of bits 306 (at block 408). For example, the baseline address may include the concatenation of the first set of bits 304 and the second set of bits 306. The electronic processor 202 then generates a plurality of network addresses wherein each of the plurality of network addresses includes the baseline address and a unique offset (for example, different values for the unique offset 308 as described above) (at block 410). As described above with respect to FIG. 3, each network address included the plurality of network addresses may also include the prefix 302. Accordingly, each unique network address of the plurality of network addresses generated by the electronic processor 202 may include the prefix 302, the first set of bits 304 based on geographical coordinates, the second set of bits 306 based on a random number, and the unique offset 308 (a unique value with in a range of possible population values, such as 0 to 128). Therefore, the addresses included in the pool of network addresses generated by the server 108 may each include an identical value for the prefix 302, an identical value for the first set of bits 304, and an identical value for the second set of bits 306 but may each include a different value for the unique offset 308.

After generating the plurality of network addresses, the electronic processor 202 assigns one of the plurality of network addresses to one of the plurality of communication devices 104 (at block 412). The assigned network address allows messages to be delivered to the associated communication device.

In some embodiments, two communication systems may merge to form a network that includes the plurality of communication devices from each communication system. In this situation, there is a risk that the pool of network address generated for one of the communication systems may overlap with the pool of network addresses generated for the other communication system. This overlap may cause an address conflict that may delay or inhibit communications through the merged network. Such an address conflict may be especially problematic within public safety networks that handle communications relating to public safety. Furthermore, public safety networks may be routinely deployed to handle public safety situations as they occur. Therefore, public safety networks may routinely need to be merged with existing networks.

To handle these mergers and further reduce the likelihood of an address conflict, the server 108 of FIG. 2 (the electronic processor 202) may transmit a beacon (for example, using the optional beacon transceiver 209) that alerts other servers of the value of the baseline address generated by the server 108. A server receiving the beacon may use the received beacon to generate a pool of addresses that does not overlap with the pool of addresses generated by the server 108 to allow for subsequent mergers, such as by selecting a different value for the second set of bits 306.

The beacon may be transmitted by the optional beacon transceiver 209. In some embodiments, the beacon transmitted by the server 108 is a one-way transmission and has a limited range. Also, in some embodiments, the range of the transmitted beacon may impact the generation of the network addresses. For example, as noted above, the portions of geographical coordinates included in the first set of bits 304 may establish a reuse distance that indicates a distance between servers selecting the same value for the first set of bits 304. Accordingly, the portions of the geographical coordinates selected for the value of the first set of bits 304 may be selected such that the reuse distance is less than the range of the beacon. In these situations, even when multiple servers generate the same value for the first set of bits 304, each server may receive a beacon transmitted by the other servers that, as described below, causes each server to generate a baseline address (for example, a value for the second set of bits 306) that is different than the baseline address used by other servers.

Figure 6:
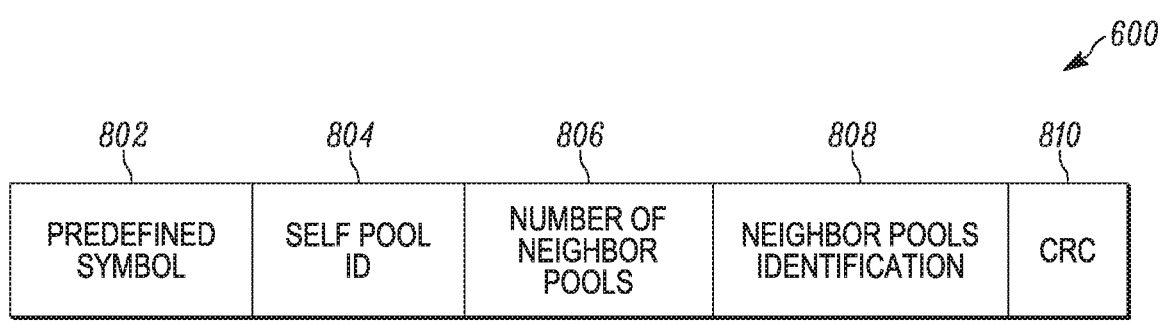
FIG. 6 illustrates a structure of a beacon transmitted by the server included in the system of FIG. 1 in accordance with some embodiments.

For example, FIG. 6 illustrates a structure 600 of a beacon generated and transmitted by the server 108 in accordance with some embodiments. It should be understood that the structure 600 illustrated in FIG. 6 is merely provided as an example, and a beacon may include fewer, additional, or different sections than illustrated in FIG. 6. Similarly, the order of the sections illustrated in FIG. 6 is provided as one example order and the order of the sections may be different in other embodiments.

In some embodiments, a beacon may include 256 bits. A beacon may also be divided into one or more sections, such as a predefined symbol 802, a self-pool identification (ID) 804, a number of neighbor pools 806, a neighbor pools identification 808, and a cyclic redundancy check (CRC) 810. The predefined symbol 802 may represent a unique identifier to identify a beacon as including address pool information. In some embodiments, the predefined symbol includes 32 bits. The cyclic redundancy check 810 includes an error-detecting code that a server receiving a beacon may use to detect errors in the data included in the beacon. In some embodiments, the cyclic redundancy check includes 9 bits.

The self-pool identification 804, the number of neighbor pools 806, and neighbor pools identification 808 are apportioned among the remaining bits of the beacon (for example, among 215 bits when a beacon includes 256 bits). The self-pool identification 804 includes an identification of the pool of network addresses generated by the server 108. For example, in some embodiments, the self-pool identification 804 includes the baseline address. In some embodiments, the self-pool identification 804 includes 24 bits.

The number of neighbor pools 806 includes the number of pools of networks that the server 108 is aware of (beacons received by the server 108 from other servers). In some embodiments, the number of neighbor pools 806 includes 8 bits. Similarly, the neighbor pools identification 808 includes the identifications of the pools of network addresses that the server 108 is aware of (for example, an identifier, such as the baseline address included in each beacon received by the server 108 from other servers). In some embodiments, the neighbor pools identification 808 includes 183 bits. When the server 108 does not need all of the bits included in the neighbor pools identification 808, the server 108 may pad the neighbor pools identification 808 with leading zeros.

Accordingly, the server 108 may transmit a beacon to notify other servers within range of the beacon of the baseline address the server 108 is using for generating a pool of network address. As noted above, the beacon may also notify the other servers within range of the beacon of the baseline address the server 108 has received within beacons transmitted by other servers.

Figure 7:
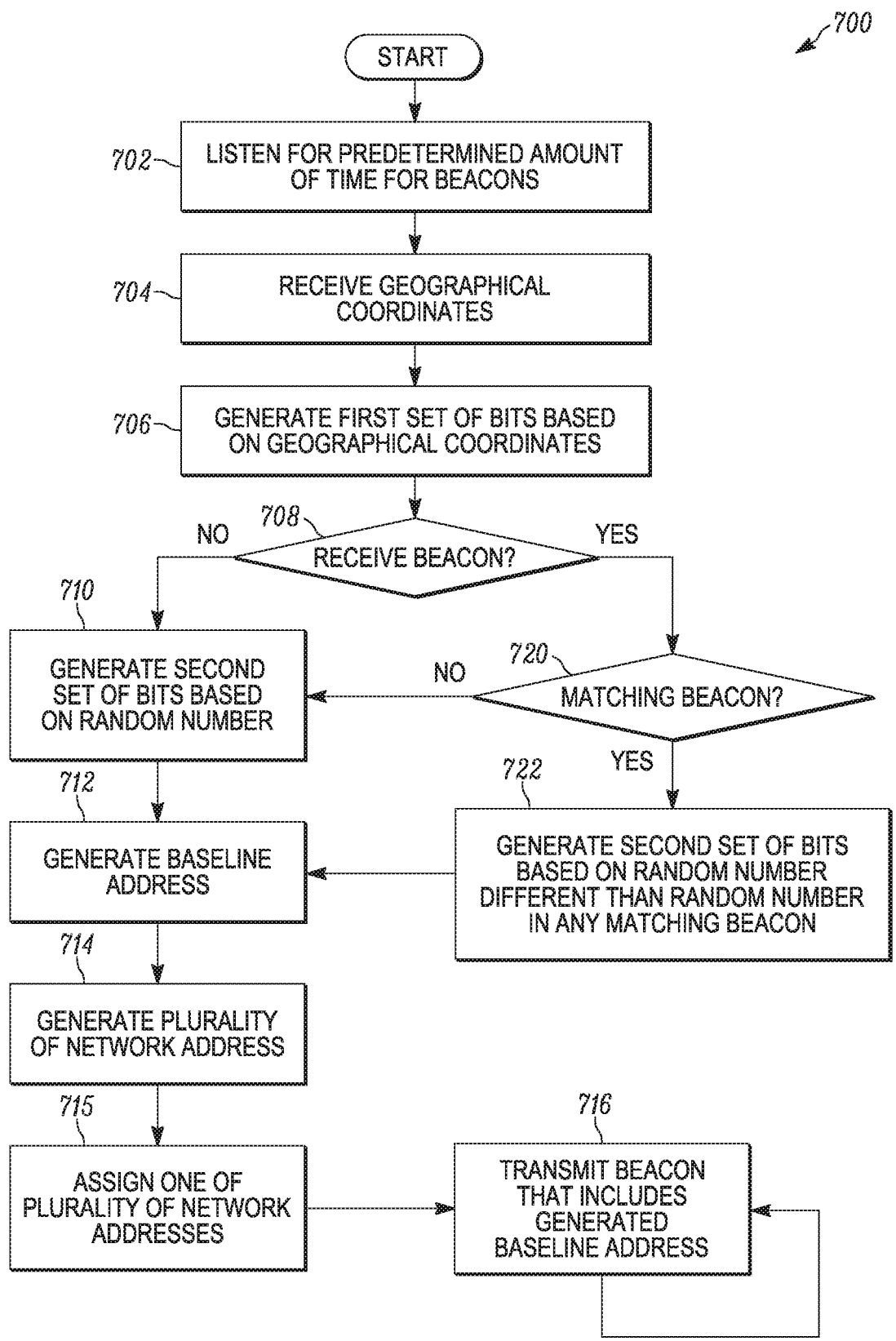
FIG. 7 is a flowchart illustrating another method of generating a plurality of network addresses performed by the system of FIG. 1 in accordance with some embodiments.

Similarly, when the server 108 receives a beacon, the server 108 may generate a baseline address that differs from the baseline address included in the received beacon. For example, FIG. 7 is a flowchart illustrating another method 700 of generating network addresses for the plurality of communication devices 104 in accordance with some embodiments. The method 700 is described as being performed by the server 108 and, in particular, the electronic processor 202. However, it should be understood that the functionality illustrated in the method 700 may be distributed among multiple devices, such as multiple servers.

As illustrated in FIG. 7, the method 700 includes listening for beacons transmitted by other servers for a predetermined time using the optional beacon transceiver 209 (at block 702). Any beacons received by the electronic processor 202 through the beacon transceiver 209 (referred to herein as "received beacons" as compared to "transmitted beacons" transmitted by the server 108) are stored and used as described below. As described above with respect to FIG. 6, each received beacon may include an identification of a pool of network addresses, and, in particular, a baseline address that includes a value for the first set of bits 304 and a s value of the second set of bits 306 generated by another server (different from the server 108).

After the predetermined time has expired, the electronic processor 202 receives geographical coordinates of the network 110 as described above with respect to the method 400 (at block 704). The electronic processor 202 generates a first set of bits 304 based on the geographical coordinates as also described above with respect to the method 400 (at block 706).

After generating the first set of bits 304, the electronic processor 202 determines whether any of the beacons were received during the predetermined time (at block 708). When no beacons were received, the electronic processor 202 generates a second set of bits 306 based on a random number as described above with respect to method 400 (at block 710). Similarly, as also described above with respect to method 400, the electronic processor 202 generates a baseline address that includes the first set of bits 304 and the second set of bits 306 (at block 712). The electronic processor 202 also generating a plurality of network addresses wherein each of the plurality of network addresses includes the baseline address and a unique offset (for example, different values for the unique offset 308 as described above) (at block 714) and assigns one of the plurality of network addresses to one of the plurality of communication devices 104 (at block 715). As described above with respect to FIG. 3, each network address may also include the prefix 302.

As illustrated in FIG. 7, the electronic processor 202 may also transmit a beacon using the optional beacon transceiver 209 that includes the baseline address generated by the electronic processor 202 (referred to herein as a "transmitted beacon") (at block 716). As described above with respect to FIG. 6, the transmitted beacon informs other servers within range of the beacon of the baseline address generated by the electronic processor 202. In some embodiments, the electronic processor 202 transmits the beacon periodically. For example, in some embodiments, the electronic processor 202 transmits the beacon at a rate less than the predetermined time the electronic processor 202 listened for received beacons as described above (at block 702). Transmitting the beacon at a rate less than the predetermined time allows other servers within range of the beacon to receive the beacon and respond to the transmitted beacon as described above.

Alternatively, when the electronic processor 202 receives a beacon from one or more other servers during the predetermined time period (at block 708), the electronic processor 202 determines whether the value of the first set of bits 304 generated by the electronic processor 202 (at block 706) is identical to the value of the first set of bits 304 included in any received beacon (referred to herein as "matching beacons") (at block 720). In other words, the electronic processor 202 determines whether any servers transmitting beacons within range of the server 108 generated a value for first set of bits 304 that is identical to the value of the first set of bits 304 generated by the electronic processor 202. As noted above, since only a portion of the geographical coordinates are included in the first set of bits 304, multiple servers may generate the same value for the first set of bits 304 even when the servers are not located at the exact same geographic location.

When the electronic processor 202 determines that there are no matching beacons (at block 720), the electronic processor 202 generates the second set of bits 306 as described above (at block 710) and generates the baseline address including the first set of bits 304 and the second set of bits 306 as also described above (at block 712). Similarly, the electronic processor 202 generates the plurality of network addresses (at block 714), assigns one of the plurality of network addresses to one of the plurality of communication devices 104 (at block 715), and may also transmit a beacon (at block 716) as described above. As noted above with respect to FIG. 6, in some embodiments, when the server 108 has received beacons from other servers, the electronic processor 202 may transmit a beacon (at block 716) that includes the baseline address generated by the electronic processor 202 and the baseline address included in any received beacon (for example, within the neighbor pools identification 808).

Alternatively, when the electronic processor 202 determines there is one or more matching beacons (at block 720), the electronic processor 202 generates the second set of bits 306 based on a random number excluding the random numbers represented by the second set of bits 306 included in each matching beacon (at block 722). In other words, the electronic processor 202 may generate a random number (as the value for the second set of bits 306) to makes the baseline address generated by the electronic processor 202 different than the baseline address included in any matching beacon.

For example, when there are one or more matching beacons, the electronic processor 202 may generate a random number as described above and may compare the generated random number to the random number represented by the second set of bits included in each matching beacon. When the generated random number is identical to a random number represented in a matching beacon, electronic processor 202 may generate a new random number and compare the new random number with the random numbers represented in each matching beacon. The electronic processor 202 may repeat this process until the random number generated by the electronic processor 202 is different than the random number represented in each matching beacon.

After generating the second set of bits 306 based on the generated random number (at block 722), the electronic processor 202 generates the baseline address including the first set of bits 304 and the second set of bits 306 as also described above (at block 712). Similarly, the electronic processor 202 generates the plurality of network addresses (at block 714), assigns one of the plurality of network addresses to one of the plurality of communication devices 104 (at block 715), and may also transmit a beacon (at block 716).

It should be understood that, in some embodiments, a beacon transmitted by a server may include the value of the second set of bits 306 rather than the entire baseline address. In these embodiments, the electronic processor 202 may compare a generated random number to the random numbers represented in all received beacons without first identifying whether a received beacon is a matching beacon. Similarly, in some embodiments, the electronic processor 202 may generate a random number that is different than each random number represented in a received beacon even when a received beacon also includes a value of the first set of bits 304. In other words, in some embodiments, the electronic processor 202 may generate a random number that is different than each random number represented in a received beacon.

Also, it should be understood that in some embodiments, the server 108 may communicate a beacon, the baseline address, or a portion of the baseline address to one or more of the plurality of communication devices 104 and the communication devices receiving this data may transmit a beacon on behalf of the server 108 in addition to or as an alternative to the server 108 transmitting the beacon. Similarly, in some embodiments, one or more of the plurality of communication devices 104 may receive a beacon and may communicate the received beacon to the server 108.

Thus, embodiments of the invention provide methods and systems for generating a plurality of network addresses (a pool of network addresses) for a plurality of communication devices communicating over a network. The methods and systems described herein allow a server to generate a pool of network addresses based on geographical coordinates of a network and, optionally, generate a baseline address for the pool of network addresses that differs from baseline addresses generated by other servers for other networks. Creating such a distinct baseline address allows networks to be merged while reducing the likelihood of an address conflict.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of generating a plurality of network addresses for a plurality of communication devices communicating over a network, the method comprising:
   receiving, with an electronic processor included in a server, geographical coordinates of the network;
   generating, with the electronic processor, a first set of bits based on the geographical coordinates;
   generating, with the electronic processor, a second set of bits based on a random number;
   generating, with the electronic processor, a baseline address including the first set of bits and the second set of bits;
   generating the plurality of network addresses, wherein each of the plurality of network addresses includes the baseline address and a unique offset; and
   assigning one of the plurality of network addresses to one of the plurality of communication devices.

2. The method of claim 1, wherein receiving the geographical coordinates includes receiving the geographical coordinates from a navigation unit.

3. The method of claim 1, wherein receiving the geographical coordinates includes retrieving the geographical coordinates from a memory of the server.

4. The method of claim 1, wherein generating the first set of bits includes
   selecting a first sub-string of bits from a latitudinal coordinate included in the geographical coordinates;
   selecting a second sub-string of bits from a longitudinal coordinate included in of the geographical coordinates; and
   generating the first set of bits including the first sub-string of bits and the second sub-string of bits.

5. The method of claim 4, wherein selecting the first sub-string of bits from the latitudinal coordinate includes selecting the first sub-string of bits from the latitudinal coordinate excluding one or more most significant bits of the latitudinal coordinate.

6. The method of claim 4, wherein selecting the second sub-string of bits from the longitudinal coordinate includes selecting the second sub-string of bits from the longitudinal coordinate excluding one or more most significant bits of the longitudinal coordinate.

7. The method of claim 1, wherein generating the second set of bits based on the random number includes
   receiving a beacon including a second baseline address associated with a second network, the second baseline address including a first set of bits and a second set of bits;
   determining whether the first set of bits included in the second baseline address is identical to the first set of bits included in the first baseline address; and
   responsive to determining that the first set of bits included in the second baseline address is identical to the first set of bits included in the first baseline address, generating the random number excluding the second set of bits included in the second baseline address.

8. The method of claim 7, further comprising transmitting a second beacon including the first baseline address.

9. The method of claim 7, further comprising transmitting a second beacon including the first baseline address and the second baseline address.

10. The method of claim 1, wherein the each of the plurality of network addresses is thirty-two bits.

11. The method of claim 1, wherein the second set of bits is based only on the random number.

12. A server for generating a plurality of network addresses for a plurality of communication devices communicating over a network, the server comprising:
   a memory storing a plurality of instructions;
   an electronic processor electrically coupled to the memory and configured to execute the plurality of instructions to
   receive geographical coordinates of the network,
   generate a first set of bits based on the geographical coordinates,
   generate a second set of bits based on a random number,
   generate a baseline address including the first set of bits and the second set of bits,
   generate the plurality of network addresses, wherein each of the plurality of network addresses includes the baseline address and a unique offset, and
   assign one of the plurality of network addresses to one of the plurality of communication devices.

13. The server of claim 12, further comprising a navigation unit configured to receive the geographical coordinates.

14. The server of claim 12, wherein the first set of bits includes a first sub-string of bits selected from a latitudinal coordinate included in the geographical coordinates and a second sub-string of bits selected from a longitudinal coordinate included in of the geographical coordinates.

15. The server of claim 14, wherein the first sub-string of bits excludes one or more most significant bits of the latitudinal coordinate.

16. The server of claim 14, wherein the second sub-string of bits excludes one or more most significant bits of the longitudinal coordinate.

17. The server of claim 12, further comprising a transceiver configured to receive a beacon including a second baseline address including a first set of bits and a second set of bits and wherein the electronic processor is configured to generate the second set of bits based on the random number by
determining whether the first set of bits included in the second baseline address is identical to the first set of bits included in the first baseline, and
responsive to determining that the first set of bits included in the second baseline address is identical to the first set of bits included in the first baseline, generating the random number excluding the second set of bits included in the second baseline address.

18. The server of claim 17, wherein the transceiver is further configured to transmit a second beacon including the first baseline address.

19. The server of claim 17, wherein the transceiver is further configured to transmit a second beacon including the first baseline address and the second baseline address.

20. A system comprising:
a plurality of communication devices communicating over a network; and
a server for generating a plurality of network addresses for the plurality of communication devices, the server including
a transceiver,
an electronic processor electrically coupled to the transceiver and configured to
generate a first set of bits based on a geographical coordinates of the network,
generate a second set of bits based on a random number,
generate a baseline address including the first set of bits and the second set of bits,
generate the plurality of network addresses, wherein each of the plurality of network addresses includes the baseline address and a unique offset,
assign one of the plurality of network addresses to one of the plurality of communication devices, and
transmit a beacon including the random number with the transceiver.

21. The system of claim 20, wherein the first set of bits includes a first sub-string of bits selected from a latitudinal coordinate included in the geographical coordinates and a second sub-string of bits selected from a longitudinal coordinate included in the geographical coordinates.

22. The system of claim 20, wherein the transceiver is configured to receive a second beacon including a second random number and wherein the electronic processor is configured to generate the second set of number by generating the first random number to be different than the second random number.

* * * * *